(12) United States Patent
Orfello

(10) Patent No.: US 11,999,443 B2
(45) Date of Patent: Jun. 4, 2024

(54) REAR TRANSMISSION SELECTION SYSTEM FOR BICYCLES

(71) Applicant: C.OR.AL. S.r.l., Modena (IT)

(72) Inventor: Alfonso Orfello, Modena (IT)

(73) Assignee: C.OR.AL. S.R.L., Modena (IT)

(*) Notice: Subject to any disclaimer, the term of this patent is extended or adjusted under 35 U.S.C. 154(b) by 0 days.

(21) Appl. No.: 18/007,600

(22) PCT Filed: Jun. 3, 2021

(86) PCT No.: PCT/IB2021/054855
§ 371 (c)(1),
(2) Date: Dec. 1, 2022

(87) PCT Pub. No.: WO2021/245585
PCT Pub. Date: Dec. 9, 2021

(65) Prior Publication Data
US 2023/0227124 A1    Jul. 20, 2023

(30) Foreign Application Priority Data

Jun. 4, 2020 (IT) .......................... 102020000013297

(51) Int. Cl.
B62M 9/14 (2006.01)
(52) U.S. Cl.
CPC ...................... B62M 9/14 (2013.01)
(58) Field of Classification Search
CPC .................... B62M 9/14; B62M 9/08

USPC ............................................................ 474/78
See application file for complete search history.

(56) References Cited

FOREIGN PATENT DOCUMENTS

| DE | 202009001802 U1 | * | 5/2009 | ............ B62M 9/14 |
| FR | 2 522 102 A1 | | 8/1983 | |
| FR | 2522102 A1 | * | 8/1983 | |
| WO | WO 00/68068 A1 | | 11/2000 | |
| WO | WO-2005080186 A1 | * | 9/2005 | ............ B62M 9/10 |
| WO | WO 2019/077526 A1 | | 4/2019 | |

* cited by examiner

Primary Examiner — Gene O Crawford
Assistant Examiner — Emily R Kincaid
(74) Attorney, Agent, or Firm — ASLAN LAW, P.C.

(57) ABSTRACT

A selection system of a transmission gear in bicycles, comprising a central supporting axle of a wheel of a bicycle associated with a pair of forks of the bicycle; a cogset associated rotatable and axially sliding with the central supporting axle; a movement device/unit/component/mechanism (or the like) of the cogset on the central supporting axle; wherein the central supporting axle comprises a first end associated in a removable manner with a first fork and a second end associated axially sliding with a second fork, the central supporting axle being movable sliding with respect to the forks between a working position, wherein it is interposed between them, and a disassembly position, wherein it is at least partly pulled out of them through the second fork for the removal/assembly of the wheel.

13 Claims, 4 Drawing Sheets

REAR TRANSMISSION SELECTION SYSTEM FOR BICYCLES

CROSS-REFERENCE TO RELATED APPLICATIONS

This application claims priority to IT Patent Application No. 102020000013297 filed on Jun. 4, 2020, and this application claims priority to and is a 371 of international PCT Application No. PCT/IB2021/054855 filed on Jun. 3, 2021, the entire contents of which are hereby incorporated by reference.

TECHNICAL FIELD

The present invention relates to a selection system of the transmission gear in bicycles or the like.

BACKGROUND ART

With reference to the bicycles, from leisure bicycles to racing bicycles and the so-called mountain bikes, the use of gears adapted to allow the selection of different transmission gears is well known and widespread, in order to facilitate pedaling and adapt it to the different characteristics of the path.

In particular, the most common type of bicycle gear is the so-called derailleur gear.

The derailleur gear comprises a series of sprockets of different and predefined dimensions, placed side by side, and a mechanism controlled by the rider, known as a derailleur, adapted to displace the chain from one toothed wheel to the other and to keep the chain under tension.

Generally, in the leisure bicycles there is only one set of sprockets, so called cogs, mounted integral on the hub of the rear wheel and only one rear derailleur, while racing bicycles or mountain bikes can have more crown wheels side by side at the pedal sets and a second front derailleur.

Specifically, mountain bikes typically have a maximum of ten sprockets on the rear wheel and a maximum of three crown wheels at the pedal sets, for a total of thirty possible gears, while racing bikes typically have a maximum of eleven cogs on the rear wheel and a maximum of two crown wheels at the pedal sets, for a maximum of twenty possible gears.

The gearbox is controlled by means of one or more special levers, through which it is possible to operate the movement of the chain from one cog to another and/or from one crown wheel to another.

One of the most commonly used solutions, for example, uses a control provided with a pair of levers installed on the handlebar, wherein a first larger lever, when operated, stretches the gear cable, by shifting the derailleur and bringing the chain onto larger cogs.

The operation of a second lever, on the other hand, causes the cable to be released, by shifting the derailleur and bringing the chain onto smaller cogs.

The gears of known type do, however, have some drawbacks.

In particular, a first drawback is the fact that the continuous movements of the chain on the cogs and crown gears, as well as the fact that the chain in many cases operates in an offset position, and therefore inclined, with respect to the teeth of the cogs and crown gears, leads to considerable wear of the chain itself. As a result, the chain becomes less and less functional over time and can even break, with obvious risk for the rider, and therefore requires continuous maintenance and inspection and periodic replacement operations.

In addition, a further drawback is that, by operating in an inclined position with respect to the teeth of the cogs and crown gears, the risk of the chain falling considerably increases, with all the inconveniences and risks that this entails.

Another drawback is that, by operating at an inclined position with respect to the teeth of the cogs and crown gears, the forces transmitted to the chain through the action on the pedal sets comprise a lateral component and, therefore, not all the energy applied to the pedal sets is transmitted to the cogs.

Again, one drawback is that the number of maximum possible gears is limited, on the one hand, by the maximum size of the cogset at the hub of the rear wheel, and on the other by the maximum inclination and stroke of the chain with respect to the teeth, which cannot be exaggerated.

Last but not least, in order to overcome all the above-mentioned problems, the chain itself and the teeth and structure of the cogs and crown gears must be machined, shaped and sized in such a way as to facilitate the engagement of the chain on the teeth with any possible inclination, as well as to reduce the overall weight of the cogset.

It is therefore necessary to make chains and cogs which are suitably shaped and of increasingly reduced thickness, with a considerable increase in the overall costs of the manufacture of the gear.

It should also be pointed out that the cogs of increasingly reduced thickness also imply chains of increasingly reduced thickness and, therefore, more fragile and more prone to breakage.

To partly overcome these drawbacks, the solution described in WO 2019/077526 A1 is known. Specifically, this document describes a selection system of the transmission gear comprising a cogset associated axially sliding with a hub of a wheel of a bicycle. In particular, the cogset is provided with a plurality of cogs of different sizes and arranged side by side to each other from the smallest cog to the largest cog.

Such a selection system comprises movement means for moving the cogset on the hub between a first extreme position, wherein the smallest cog is positioned at a drive chain of the bicycle, and a second extreme position, wherein the largest cog is positioned at the point at the chain.

In this way, the transmission gear is adjustable by shifting the cogset and not the chain, so that the latter always remains axial and does not undergo excessive stress.

The aforementioned extra selection system is conveniently made so that the wheel can be removed independently of the cogset.

Contrary to known solutions, in fact, the cogset is not associated with the wheel but with the bicycle frame.

For this purpose, the selection system is provided with quick removal/fitting means of the wheel independently of the cogset.

In particular, the removal/fitting means are associated with the bicycle frame and comprise rotational means for rotating one of the forks, allowing it to be moved away from the hub.

In other words, the forks are moved away from each other to allow for wheel replacement.

This solution however implies an intervention on the bicycle frame which causes a structural and manufacturing complication of the bicycle itself.

It is evident, therefore, that this last solution is susceptible to improvement.

DESCRIPTION OF THE INVENTION

The main aim of the present invention is to devise a selection system of the transmission gear in bicycles or the like which allows keeping the chain straight and axial during use, while allowing for simple and rapid wheel replacement.

Another object of the present invention is to devise a selection system of the transmission gear in bicycles or the like which allows for easy wheel replacement without the need to operate on the bicycle frame.

Another object of the present invention is to devise a selection system of the transmission gear in bicycles or the like that will overcome the aforementioned drawbacks of the prior art within the scope of a simple, rational, easy, effective to use and affordable solution.

The objects set out above are achieved by the present selection system of the transmission gear in bicycles or the like having the characteristics of claim 1.

BRIEF DESCRIPTION OF THE DRAWINGS

Other characteristics and advantages of the present invention will become more apparent from the description of a preferred, but not exclusive, embodiment of a selection system of the transmission gear in bicycles or the like, illustrated by way of an indicative, yet non-limiting example, in the accompanying tables of drawings wherein.

EMBODIMENTS OF THE INVENTION

Figure 1:
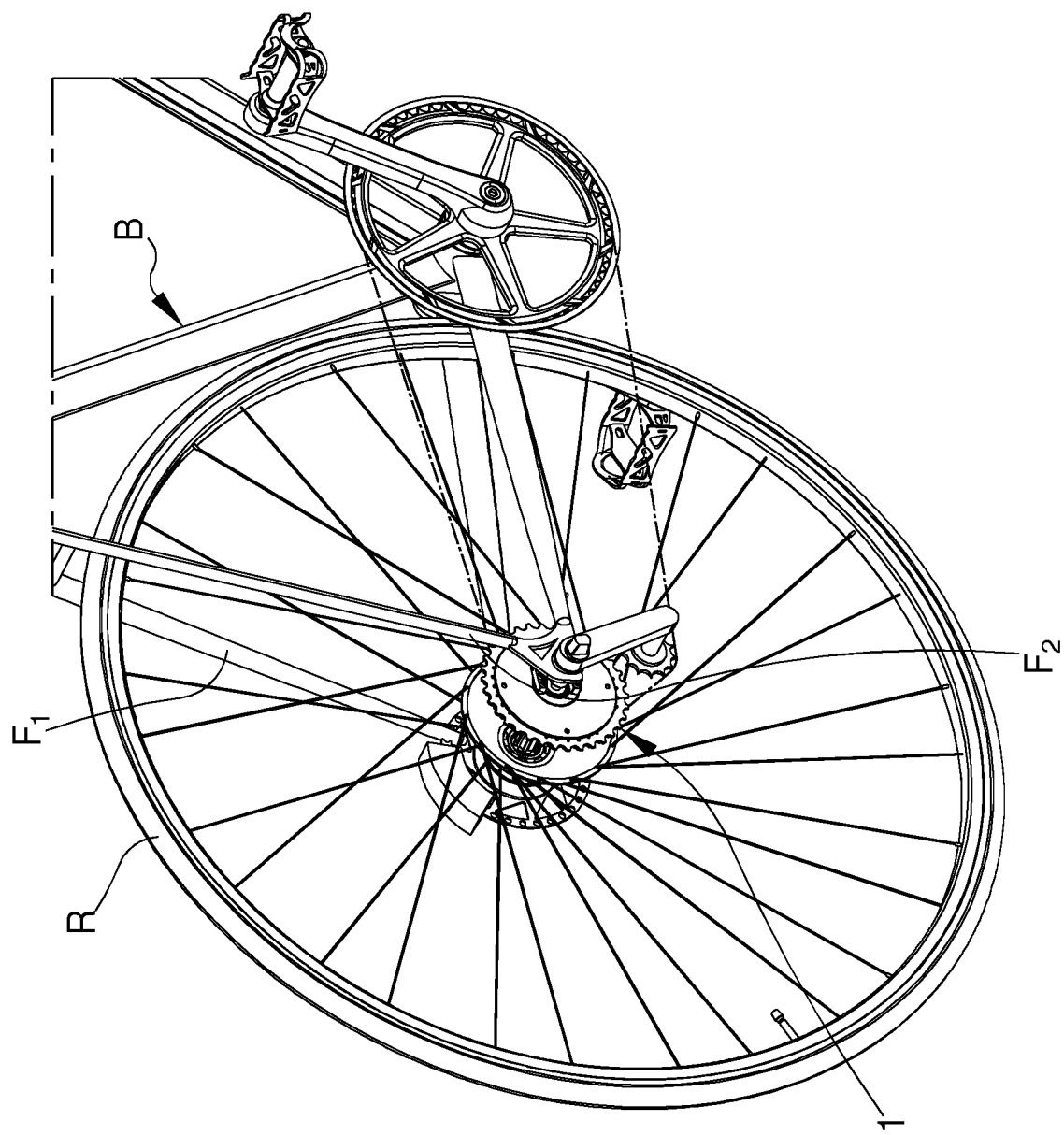
FIG. 1 is an axonometric view of the selection system of the transmission gear according to the invention applied to a bicycle.
Figure 2:
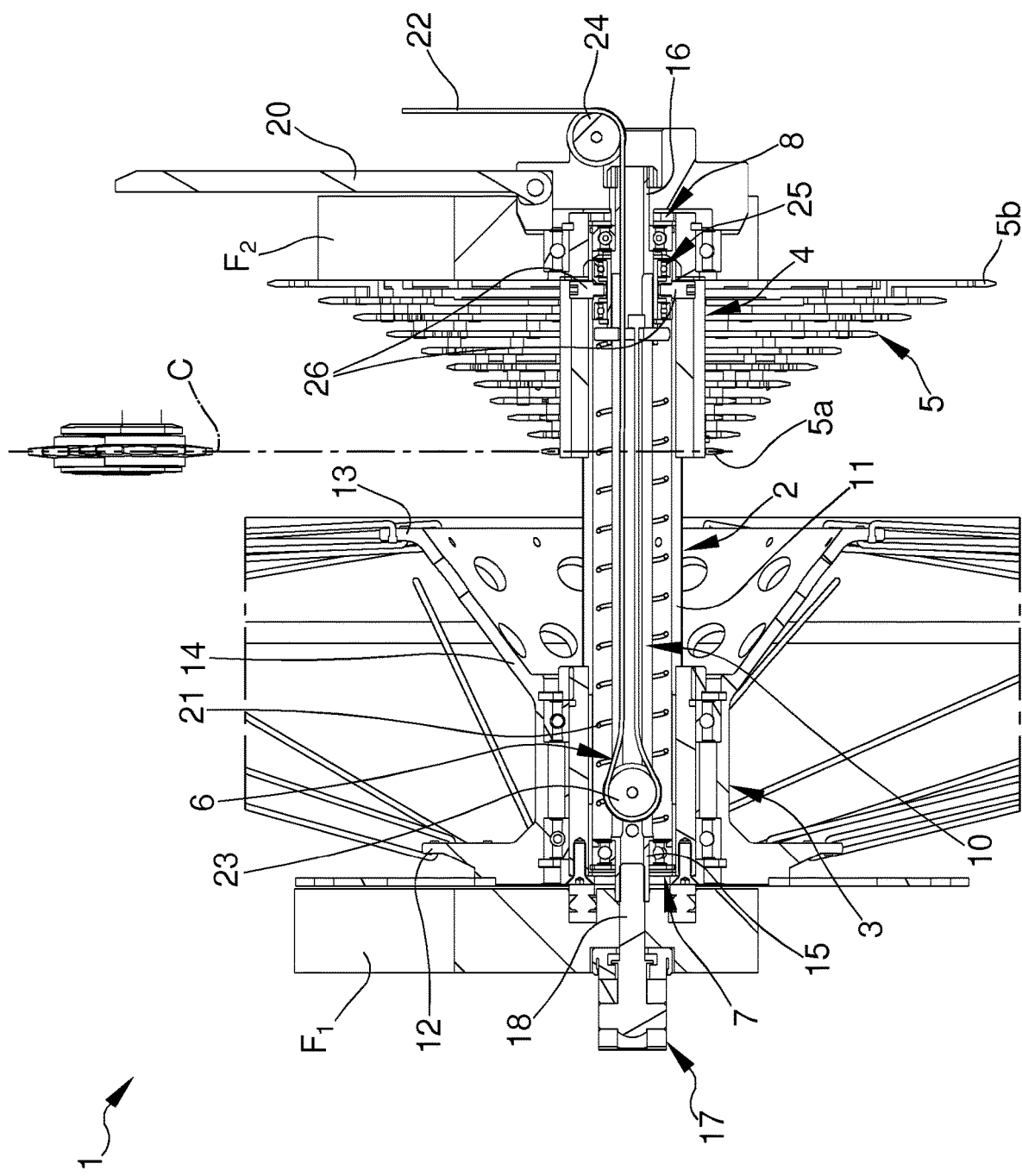
FIGS. 2-4 are cross-sectional views of the selection system according to the invention, in different operating configurations.

With particular reference to such figures, reference numeral 1 globally indicates a selection system of the transmission gear in bicycles or the like.

In the context of the present disclosure, by "bicycle" is meant any type of bicycle, from leisure ones, to racing and mountain bikes.

The selection system 1 comprises at least one central supporting axle 2 of a wheel R of a bicycle B associated with a pair of forks F1, F2 of the bicycle B.

In the context of the present disclosure, the term "forks" means a pair of extensions of the bicycle frame, on the right side and on the left side of the bicycle, which support the wheel.

The selection system 1 also comprises at least one hub member 3 associated rotatable and removable with the central supporting axle 2 and arranged at a first fork F1 of the bicycle B.

Thus, the central supporting axle 2 and the hub member 3 define the hub of the wheel R of the bicycle B through which the wheel R can rotate.

In particular, the selection system 1 is intended to be applied to the rear wheel R of the bicycle B.

In more detail, the central supporting axle 2 is connected to the forks F1, F2 while the hub member 3 is associated with the spokes of the wheel R.

The selection system 1 also comprises at least one cogset 4 associated rotatable and axially sliding with the central supporting axle 2.

The cogset 4 is provided with a plurality of cogs 5 of different sizes arranged side by side, from the smallest cog 5a to the largest cog 5b.

In particular, the cogset 4 is associated with the central supporting axle 2 with the smallest cog 5a facing the hub member 3 and with the largest cog 5b facing the second fork F2.

The selection system 1 further comprises movement means 6 of the cogset 4 on the central supporting axle 2 between a first extreme position, wherein it is arranged at a second fork F2 of the bicycle B, with the smallest cog 5a positioned at a drive chain C of the bicycle B, and a second extreme position, wherein it is moved away from the second fork F2 with the largest cog 5b positioned at the chain C.

Substantially, the selection system 1 allows varying the transmission gear by moving the cogset 4 with respect to the central supporting axle 2 and keeping the chain C straight.

According to the invention, the central supporting axle 2 comprises a first end 7 associated in a removable manner with the first fork F1 and a second end 8 associated axially sliding with the second fork F2.

The central supporting axle 2 is movable sliding with respect to the forks F1, F2 between a working position, wherein it is interposed between the forks F1, F2 and wherein the first end 7 is associated with the first fork F1, and a disassembly position, wherein it is at least partly pulled out of the forks F1, F2 through the second fork F2 and wherein the first end 7 is moved away from the first fork F1 for the removal/fitting of the wheel R.

In the disassembly position, the central supporting axle 2 continues to support the cogset 4 but it is pulled out of the hub member 3 to allow the removal of the wheel R.

The hub member 3, in fact, defines an operating seat 9 inside which the central supporting axle 2 is inserted in the working position. The central supporting axle 2 is movable sliding with respect to the operating seat 9 between the working position and the disassembly position.

Advantageously, the central supporting axle 2 comprises at least a first tubular element 10 associated with the forks F1, F2 and a second tubular element 11 associated externally with the first tubular element 10, locked together sliding and movable in rotation with respect thereto, and supporting the cogset 4.

The first tubular element 10 and the second tubular element 11 are substantially coaxial and the second tubular element 11 is fitted on the first tubular element 10.

In the disassembly position, both the first tubular element 10 and the second tubular element 11 are pulled out of the forks F1, F2 through the second fork F2, locked together to each other.

In the working position, on the other end, the first tubular element 10 remains substantially stationary, while the second tubular element 11 is set in rotation by the cogset 4.

The cogset 4 is, in fact, associated locked together with the second tubular element 11 in rotation and axially sliding thereto.

In other words, the rotation of the cogset 4 by the chain C causes the simultaneous rotation of the second tubular element 11 which transmits the motion to the hub member 3 and, consequently, to the wheel R.

In particular, the central supporting axle 2 is associated with the operating seat 9 of the hub member 3 through the second tubular element 11.

The hub member 3 is locked together in rotation to the second tubular element 11 so as to transmit motion to the wheel R and is, in addition, axially sliding with respect thereto, so as to be removed during the replacement operation of the wheel R.

According to a preferred embodiment, shown in the figures, the operating seat 9 is formed inside at least a first portion of the hub member 3, arranged at the first fork F1.

In particular, according to this preferred embodiment, the portion of the hub member 3 provided with the operating seat 9 comprises a first flange 12 for fixing the spokes of the wheel R.

A second flange 13 is made at a second portion of the hub member 3.

The hub member 3 comprises a housing 14 adapted to partly accommodate the cogset 4, when the latter is moved from the first extreme position to the second extreme position.

The housing 14 is defined at the second portion of the hub member 3.

Figure 3:
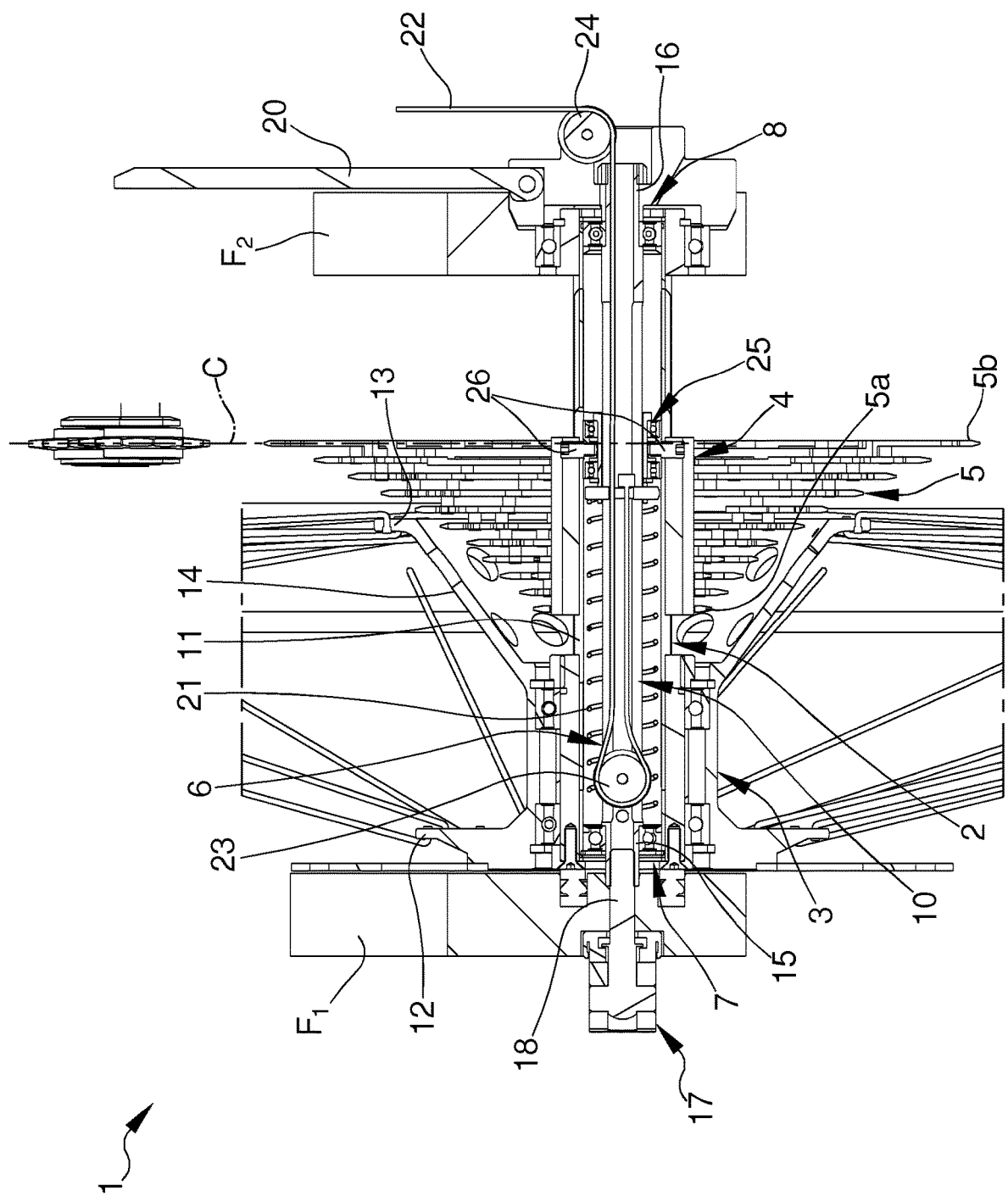
Figure 4:
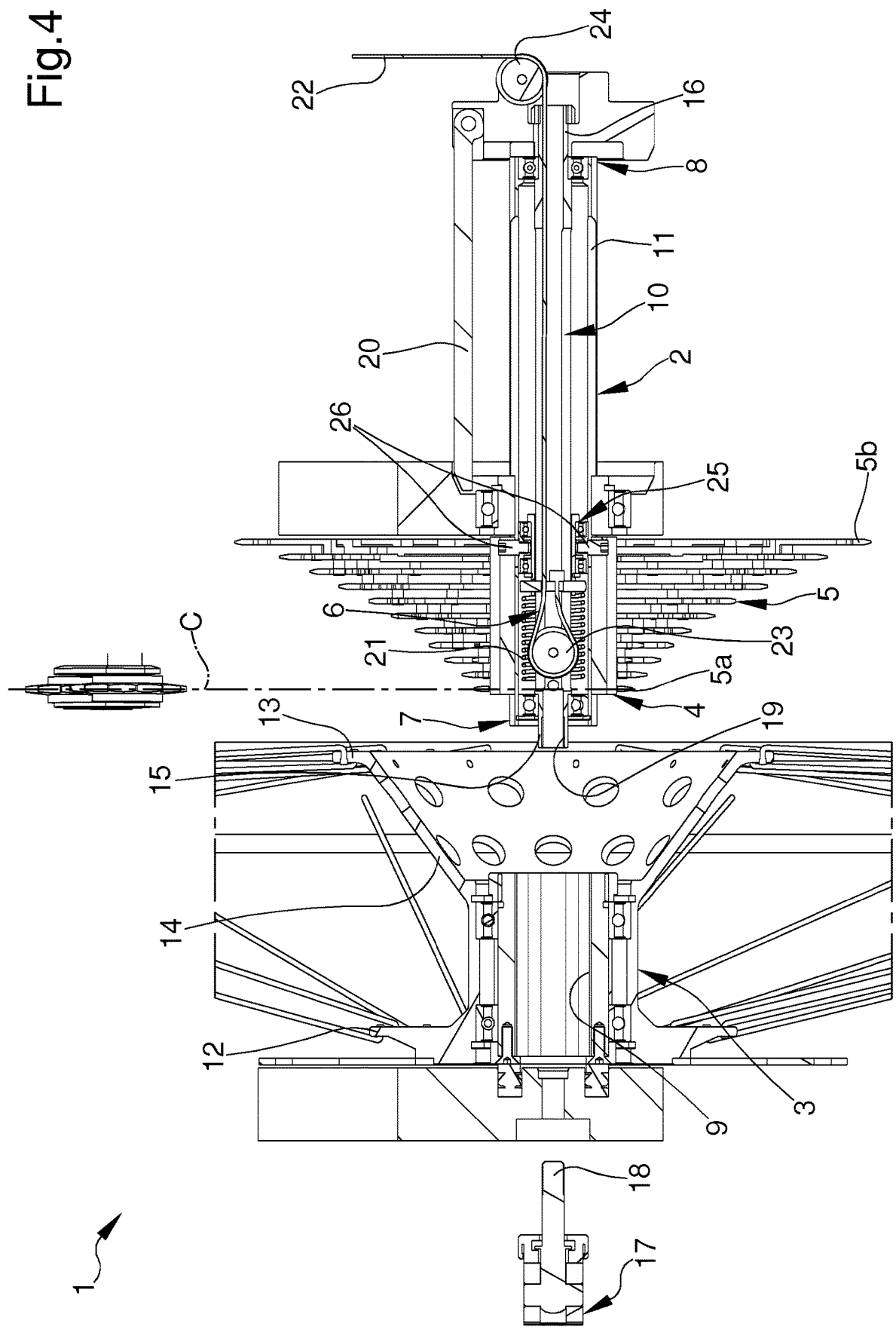

The housing 14 is adapted to progressively house the cogs 5 during the movement of the cogset 4. (FIG. 3)

Advantageously, still according to the preferred embodiment shown in the figures, the housing 14 has a substantially hollow truncated-cone conformation with increasing cross-sectional area away from the first fork F1.

In other words, the conformation of the housing 14 substantially corresponds to the conformation of the cogset 4 which, when in the second extreme position, is accommodated to size and almost completely inside the housing 14.

According to a possible variation, the walls of the housing 14 are provided with a plurality of openings which are adapted to reduce the overall weight thereof.

Conveniently, the first tubular element 10 comprises a first extreme portion 15 associable with the first fork F1 and a second extreme portion 16 associated movable sliding with the second fork F2.

Conveniently, the selection system 1 comprises at least one retention element 17 of the first extreme portion 15 with respect to the first fork F1.

The retention element 17 provides a firm anchorage of the selection system 1 to the frame of the bicycle B and prevents possible axial movements of the central supporting axle 2 during the use of the bicycle B.

In the embodiment shown in the figures, the retention element 17 comprises a threaded portion 18 associable with a corresponding threaded hole 19 defined on the first tubular element 10 at the first extreme portion 15.

It cannot however be ruled out that the retention element 17 be of a different type and be associable with the first extreme portion 15 in another way.

Advantageously, the selection system 1 comprises at least one locking element 20 associated with the second end 8 and adapted to operate in conjunction with the second fork F2 in order to keep the central supporting axle 2 in the disassembly position.

The locking element 20, of the type of a lever, is movable in rotation with respect to the second extreme portion 16. In the working position, the locking element 20 is transverse to the central supporting axle 2 and is arranged in contact with the second fork F2 so as not to hinder the user of the bicycle B during use. In the disassembly position, the locking element 20 is rotated and is arranged substantially parallel to the central supporting axle 2. In such a position, the locking element 20 abuts against the second fork F2 and prevents the central supporting axle 2 from fitting accidentally between the two forks F1, F2 during the replacement operation of the wheel R.

It cannot however be ruled out that the locking element 20 be of a different type.

As anticipated above, in the working position, the cogset 4 is sliding with respect to the central supporting axle 2 to allow varying the transmission gear.

The movement means 6 comprise elastic means 21 for pushing the cogset 4, externally associated with the first tubular element 10, operationally interposed between the cogset 4 and the first end 7 and adapted to exert a pressing force on the cogset 4 towards the first extreme position.

Substantially, the elastic means 21, of the type of, e.g., a spring, comprise an end part locked together with the first extreme portion 15 and an opposite end part associated with the cogset 4.

More specifically, the cogset 4 comprises a bushing member 25, associated with the cogs 5 and interposed between the first tubular element 10 and the second tubular element 11, adapted to allow the cogset 4 to slide on the central supporting axle 2.

In particular, the bushing member 25 comprises a pair of sliding pins 26 associated with the cogs 5 associated sliding with corresponding slots defined in the second tubular element 11.

The contraction of the elastic means 21 causes the displacement of the cogset towards the second extreme position, i.e., from the second fork F2 towards the first fork F1.

Conveniently, the movement means 6 comprise at least one actuating cable 22 connected between the cogset 4 and an actuating control of the bicycle B and accommodated at least partly inside the first tubular element 10.

In more detail, the actuating cable 22 is attached to one end of the bushing member 25.

Through the actuating control, the actuating cable 22 is tensioned or released.

The tensioning of the actuating cable 22 causes the cogset 4 to slide towards the second extreme position, counteracting the elastic means 21.

The release of the actuating cable 22 causes, on the other hand, the opposite movement by the elastic means 21 to the first extreme position.

The movement means 6 comprise at least one pulley element 23, associated in rotation with the first tubular element 10, at the first extreme portion 15, and around which the actuating cable 22 is at least partly wound.

The pulley element 23 is arranged at least partly inside the first tubular element 10.

Substantially, the actuating cable 22 extends from the actuating control along the second fork F2, is fitted inside the first tubular element 10 through the second extreme portion 16, partly wound around the pulley element 23, and attached to the bushing member 25 of the cogset 4.

The movement means 6 comprise at least one supporting roller 24, associated in rotation with the central supporting axle 2 at the second end 8 and around which the actuating cable 22 is at least partly wound.

The supporting roller 24 supports the actuating cable 22 during the tensioning/release by the actuating control.

Conveniently, the selection system 1 comprises at least one freewheel mechanism operationally interposed between the hub member 3 and the central supporting axle 2.

The freewheel mechanism is known to the technician in the field and allows the motion of the hub member 3 to be decoupled from the movement of the cog set 4.

The freewheel mechanism allows the wheel R to move in the direction of travel even when the user is not actively operating on the cogset 4.

The operation of the selection system 1 according to the invention is as follows.

While the bicycle is in use, the central supporting axle 2 is in the working position and allows the wheel R to rotate.

The rotation of the cogset 4 causes the rotation of the second tubular element 11 and, therefore, of the hub member 3 supporting the wheel R.

To vary the transmission gear, the actuating cable 22 is tensioned/released to move the cogset 4 towards the second extreme position or the first extreme position, respectively.

In particular, the actuating cable 22 operates on the elastic means 21 thus causing the contraction or stretch thereof.

In order to replace the wheel R, the central supporting axle is moved to the disassembly position.

To this end, the actuating cable 22 is released, thus moving the cogset to the first extreme position, after which the retention element 17 is removed from the first extreme portion 15 to allow the first end 7 to be moved away from the first fork F1.

At this point, the central supporting axle 2 is partly pulled out through the second fork F2 to release the hub member 3. During this operation, the first end 7 moves close to the second fork F2 and the elastic means 21 compress.

The locking element 20 is, therefore, rotated to prevent the central supporting axle 2 from returning to the working position.

At the end of the replacement operation, the central supporting axle 2 is moved to the working position, inside the operating seat 9 of the hub member 3 and attached to the first fork F1 through the retention element 17.

It has in practice been ascertained that the described invention achieves the intended objects, and in particular the fact is emphasized that, due to the particular conformation of the central supporting axle and of the movement means, the selection system of the transmission gear in bicycles or the like according to the invention allows the chain to be kept straight and axial during use, while at the same time allowing simple and rapid replacement of the wheel. In addition, unlike the solutions of known type, by operating on the central supporting axle in order to replace the wheel, rather than on the bicycle frame, the present selection system allows easy wheel replacement without compromising the strength and efficiency of the frame itself.

The invention claimed is:

1. A system of a transmission gear in bicycles or the like, the selection system comprising:
    at least one central supporting axle of a wheel of a bicycle associated with a pair of forks of said bicycle;
    at least one hub member associated rotatable and removable with said central supporting axle and arranged at a first fork of said bicycle;
    at least one cogset associated rotatable and axially sliding with said central supporting axle and provided with a plurality of cogs of different sizes arranged side by side, from a smallest cog to a largest cog; and
    movement means of said cogset on said central supporting axle between a first extreme position, wherein is arranged at a second fork of said bicycle with said smallest cog positioned at a drive chain of said bicycle, and a second extreme position, wherein said cogset is moved away from said second fork with said largest cog positioned at said chain, wherein
    said central supporting axle comprises a first end associated in a removable manner with said first fork and a second end associated axially sliding with said second fork, said central supporting axle being movable sliding with respect to said forks between a working position, said central supporting axle is interposed between said forks,
    said first end is associated with said first fork, and a disassembly position,
    said central supporting axle is at least partly pulled out of said forks through said second fork, and
    said first end is moved away from said first fork for the removal/assembly of said wheel.

2. The selection system according to claim 1, wherein said central supporting axle comprises at least a first tubular element associated with said forks and a second tubular element associated externally with said first tubular element locked together sliding and movable in rotation with respect thereto, and supporting said cogset.

3. The selection system according to claim 2, wherein said first tubular element comprises a first extreme portion associable with said first fork and a second extreme portion associated movable sliding with said second fork.

4. The selection system (1) according to claim 3, further comprising: at least one retention element of said first extreme portion with respect to said first fork.

5. The selection system according to claim 1, further comprising: at least one locking element associated with said second end and adapted to operate in conjunction with said second fork in order to keep said central supporting axle in said disassembly position.

6. The selection system according to claim 2, wherein said cogset is associated locked together with said second tubular element in rotation and axially sliding thereto.

7. The selection system according to claim 1, wherein said hub member defines an operating seat inside which said central supporting axle is inserted in said working position, said central supporting axle being movable sliding with respect to said operating seat between said working position and said disassembly position.

8. The selection system according to claim 3, wherein said movement means comprise elastic means for pushing said cogset, associated externally with said first tubular element, operationally interposed between said cogset and said first end and adapted to exert a pressing force on said cogset towards said first extreme position.

9. The selection system according to claim 8, wherein said movement means comprise at least one actuating cable connected between said cogset and an actuating control of said bicycle and accommodated at least partly inside said first tubular element, the tensioning of said actuating cable determining the sliding of said cogset towards said second extreme position, counteracting said elastic means.

10. The selection system according to claim 9, wherein said movement means comprise at least one pulley element, associated in rotation with said first tubular element at said first extreme portion and around which said actuating cable is at least partly wound.

11. The selection system according to claim 9, wherein said movement means comprise at least one supporting roller, associated in rotation with said central supporting axle at said second end and around which said actuating cable is at least partly wound.

12. The selection system according to claim 1, further comprising: at least one freewheel mechanism operationally interposed between said hub member and said central supporting axle.

13. A selection system of a transmission gear for wheeled vehicles, the selection system comprising:
    at least one central supporting axle of a wheel of a wheeled vehicle associated with a pair of forks of said wheeled vehicle;

at least one hub member associated rotatable and removable with said central supporting axle and arranged at a first fork of said wheeled vehicle;

at least one cogset associated rotatable and axially sliding with said central supporting axle and provided with a plurality of cogs of different sizes arranged side by side, from a smallest cog to a largest cog; and movement mechanism of said cogset on said central supporting axle between a first extreme position, wherein said cogset is arranged at a second fork of said wheeled vehicle with said smallest cog positioned at a drive chain of said wheeled vehicle, and a second extreme position, wherein said cogset is moved away from said second fork with said largest cog positioned at said chain, wherein said central supporting axle comprises a first end associated in a removable manner with said first fork and a second end associated axially sliding with said second fork, said central supporting axle being movable sliding with respect to said forks between a working position, said central supporting axle is interposed between said forks, said first end is associated with said first fork, and a disassembly position, said central supporting axle is at least partly pulled out of said forks through said second fork, and said first end is moved away from said first fork for the removal/assembly of said wheel.

\* \* \* \* \*